US012433607B2

(12) United States Patent
Shang et al.

(10) Patent No.: US 12,433,607 B2
(45) Date of Patent: Oct. 7, 2025

(54) PUNCHING RIG AND METHOD

(71) Applicant: Precision Robotics Limited, London (GB)

(72) Inventors: Jianzhong Shang, Dartford (GB); Tamas Csaba Hernadi, London (GB); Etienne Francois Joseph Dondez, Dijon (FR)

(73) Assignee: Precision Robotics Limited, London (GB)

( * ) Notice: Subject to any disclaimer, the term of this patent is extended or adjusted under 35 U.S.C. 154(b) by 182 days.

(21) Appl. No.: 18/277,198

(22) PCT Filed: Feb. 9, 2022

(86) PCT No.: PCT/GB2022/050351
§ 371 (c)(1),
(2) Date: Aug. 14, 2023

(87) PCT Pub. No.: WO2022/180359
PCT Pub. Date: Sep. 1, 2022

(65) Prior Publication Data
US 2024/0115275 A1    Apr. 11, 2024

(30) Foreign Application Priority Data

Feb. 12, 2021   (GB) ..................................... 2101970

(51) Int. Cl.
*A61B 17/17* (2006.01)
*A61B 17/04* (2006.01)
*A61B 17/16* (2006.01)

(52) U.S. Cl.
CPC ...... *A61B 17/1604* (2013.01); *A61B 17/0485* (2013.01); *A61B 17/1626* (2013.01); *A61B 17/1796* (2013.01)

(58) Field of Classification Search
CPC ............ A61B 17/1796; A61B 17/0485; A61B 17/1604
See application file for complete search history.

(56) References Cited

U.S. PATENT DOCUMENTS 3,835,860 A * 9/1974 Garretson ................. B26F 1/36
606/79
5,282,866 A * 2/1994 Cohen ................... A61F 2/3886
623/20.34
(Continued)

FOREIGN PATENT DOCUMENTS

CN    107468366 A    12/2017
CN    207693710 U    8/2018
(Continued)

OTHER PUBLICATIONS

International Search Report from PCT International Application No. PCT/GB2022/050351 dated Jun. 27, 2022.

Primary Examiner — Christian A Sevilla
(74) Attorney, Agent, or Firm — Budzyn IP Law, LLC

(57) ABSTRACT

A punching rig comprising: a base; an arm engageable with the base and movable relative to the base along a first axis, the arm comprising a chamber that extends along a chamber axis normal to the first axis; a punch slidably receivable within the chamber such that it extends along the chamber axis, which punch comprises a first end, a second end and a stop positioned between the first end and the second end; and a weight slidable along the punch between the first end and the stop.

7 Claims, 5 Drawing Sheets

(56) References Cited

U.S. PATENT DOCUMENTS

| | | | | |
|---|---|---|---|---|
| 8,556,900 | B2* | 10/2013 | Yoko .................. | A61B 17/1675 |
| | | | | 606/88 |
| 9,820,755 | B2* | 11/2017 | Garcia ............... | A61B 17/0482 |
| 10,610,381 | B2* | 4/2020 | Winslow ............ | A61B 17/1684 |

FOREIGN PATENT DOCUMENTS

| | | |
|---|---|---|
| CN | 211052271 U | 7/2020 |
| CN | 211162236 U | 8/2020 |
| CN | 211566132 U | 9/2020 |
| JP | H073832 U | 1/1995 |

* cited by examiner

PUNCHING RIG AND METHOD

CROSS-REFERENCE TO RELATED APPLICATIONS

This application is a National Stage Application under 35 U.S.C. § 371 of PCT Application No. PCT/GB2022/050351, filed Feb. 9, 2022 which claims priority to UK Patent Application No. GB2101970.8, filed Feb. 12, 2021, the entire contents of which are incorporated by reference herein.

BACKGROUND OF THE INVENTION

1. Field of the Invention

This invention relates to a punching rig for punching an object and to a method of punching an object, particularly, but not exclusively to a method of punching a ferrule. The invention has particular, although not exclusive, application in the field of manufacturing, maintaining and/or repairing tendon driven surgical robotic instruments and may be used to crimp a tendon whilst tensioned within a ferrule. The invention may also be applied to tendon driven robotics outside of the surgical field or other types of tendon driven instruments.

From herein the invention is primarily described in relation to application in the field of surgical robotics. However, this is for demonstrative purposes only and is not to the exclusion of the invention's application in other fields.

2. Description of the Related Art

Known surgical robotic instruments comprise a drive module, a shaft extending from the drive module, an articulation portion coupled to the shaft and an end effector coupled to the articulation portion. The drive module may comprise a plurality of actuators that are driven by motors to which the driver module is couplable. Each actuator may be attached to a tendon that extends from the driver module, through the shaft, to the articulation portion or end effector where they may be attached to a rotatable joint, for example. The articulation portion and end effector may therefore be actuated by controlling the actuators in the driver module to pull different tendons. In other words, the actuation portion and end effector are tendon driven.

The drive modules of some known surgical robotic instruments comprise capstan actuators which may be attached to a tendon and then rotated to wrap the tendon about the capstan and tension the tendon as required. However, such actuators are expensive to manufacture at the small scale required for minimally invasive surgical instruments and may require complex and precise methods for coupling the actuators to the motors which drive them when the surgical instrument is in use.

Some known surgical robotic instruments comprise drive modules with linearly moving actuators which may be manufactured more cost effectively at the scales required, particularly as the drive module may preferably be disposable, single-use parts to ensure sterility for use in surgical procedures. However, attaching a tendon to each linear actuator while tendon is under tension is difficult due to the actuators being positioned parallel to one another and in close proximity to one another within the surgical robotic instrument. Crimping the tendons to the actuators provides a reliable attachment but known crimping tools are too large and/or bulky to access the tightly packed actuators.

SUMMARY OF THE INVENTION

According to a first aspect of the invention, there is provided a punching rig comprising:
a base; an arm engageable with the base and movable relative to the base along a first axis, the arm comprising a chamber that extends along a chamber axis normal to the first axis; a punch slidably receivable within the chamber such that it extends along the chamber axis, which punch comprises a first end, a second end and a stop positioned between the first end and the second end; and a weight slidable along the punch between the first end and the stop.

By means of the first aspect of the invention a user may position the chamber, via movement of the arm, so that the chamber is aligned with an object to be punched such as a ferrule that requires crimping to a tendon for example. The punch may be positioned so that it extends through the chamber, along the chamber axis, and the second end rests on the object. The weight may then be dropped so that it slides down the punch from the first end until it impacts the stop. On impacting the stop, the weight imparts a force to the punch which is transferred to the object via the second end.

The weight and the punch, particularly a portion of the punch between the first end and the stop, may each be adapted so that the punch will guide the weight so that it drops along the chamber axis and impacts the stop in a controlled and safe manner. For example, in some embodiments of the invention, the weight may comprise an aperture and the punch may comprise an elongate member extending from the first end to the stop that is slidably receivable within the aperture such that the weight slides over the punch as it drops towards the stop. In other embodiments of the invention the punch may be adapted to slidably receive the weight between the first end and the stop such that the weight slides at least partially within the punch as it drops towards the stop.

The weight may be adapted to have a predetermined weight and may be dropped from a predetermined height so that the object is punched with a known force. The predetermined weight and the predetermined height may each be varied to vary the force that is applied by the punch in use. For example, the weight may be modular so that the overall weight can be increased or decreased as required. Also, the first end may be a predetermined distance from the stop so that dropping the weight from the first end results in it dropping a predetermined distance to the stop. The punch may also comprise one or more indicators between the first end and the stop that indicate where the weight should be dropped from so that it falls a predetermined height.

Once the weight has been dropped it may be repositioned ready to be dropped again, the punching action is therefore readily and rapidly repeatable. In between punching actions, the arm may be moved along the first axis to align the chamber differently with respect to the same object or to align it with a new object. For example, the punching rig may be used to punch a plurality of ferrules that are positioned next to one another in order to crimp each of the plurality of ferrules to a respective tendon. The ability to accurately reposition the chamber may allow a plurality of objects to be punched consistently and in quick succession.

In embodiments of the invention, the punch may comprise a rest positioned between the second end and the stop, which rest is abuttable against the arm when the punch is slidably received in the chamber.

In such embodiments of the invention, the second end of the punch may be passed through the chamber until the rest abuts against the arm. When the rest abuts against the arm, the punch is held such that the punch extends either side of the chamber with the first end positioned above the arm and the second end positioned below the arm.

The rest allows the arm to be moved without risk of the punch falling entirely through the chamber. When preparing to punch an object, the punch may be positioned so that the second end rests on the object, rather than the rest resting against the arm. This allows the force to be transferred to the object to be punched rather than to the arm.

In embodiments of the invention, the second end of the punch may comprise a tip that is tapered and/or pointed.

In such embodiments of the invention the force may be transferred to the object being punched more precisely. Further, the pressure applied will be greater by virtue of the reduced surface area of the punch that contacts the object being punched.

The punch may be integrally formed as a single member extending from the first end to the tip at the second end, which member comprises both the stop and the rest positioned between the first and second ends. Alternatively, the punch may be formed in portions that are attachable, and optionally removably attachable, to one another. For example, a first portion may be an elongate member extending from the first end to the stop, a second portion may be a thicker member that extends between the stop and the rest, and a third portion may be another elongate member extending from the rest to the second end. The first and third portions may each screw into the middle second portion, for example. Further, the tip may be a separate tip portion that is removably attachable to the punch. This may allow the punch to be modular in that different portions could be interchangeable depending on the application. For example, the first portion could be interchangeable to provide different predetermined heights from which the weight could be dropped from. The tip portion could be interchangeable to vary the sharpness/bluntness of the tip for punching different objects.

In embodiments of the invention, the arm may be moveable relative to the base along a second axis normal to the first axis and the chamber axis.

In such embodiments of the invention the chamber may be positioned with greater freedom relative to the object or objects to be punched. This may improve the ability to leave an object in a single position and punch the object in a variety of locations. For example, as well as being able to punch a plurality of ferrules, the punching rig may be used to punch each of the plurality of ferrules in a plurality of locations without needing to reposition the plurality of ferrules relative to the base of the punching rig.

In embodiments of the invention, the punching rig may further comprise a support bridge comprising a support beam and a support for supporting the support beam above the base, wherein the support beam comprises a plurality of grooves and the chamber is alignable with each groove.

In such embodiments of the invention, a plurality of ferrules may be positioned in the grooves to prior to being punched. The ferrules may form part of a tendon driven instrument, such as a surgical robotic instrument for example. If the ferrules were to be punched while being supported by the tendon driven instrument, the height of the ferrules relative to the punching rig would be unknown, particularly considering manufacturing tolerances that may be present in the tendon driven instrument. By resting the ferrules in the grooves of the support bridge, the ferrules may be positioned at a known and consistent height relative to the chamber and punch.

The support beam may be raised above the base and supported by the support to allow the tendon driven instrument to hang from the support beam via the ferrules.

In embodiments of the invention, the support may comprise a first leg extending between the base and a first end of the support beam and a second leg extending between the base and a second end of the support beam, wherein the first leg is spaced apart from the second leg.

In such embodiments of the invention the support bridge may be shaped and supported such that ferrules may be readily positioned in the grooves and whilst the tendon driven instrument is stable as the ferrules are punched.

In embodiments of the invention, the support bridge may be removably attachable to the base.

In such embodiments of the invention the support bridge may be moveable to allow easier positioning of the tendon driven instrument before or after being punched. The support bridge may be removed to facilitate the punching of other objects for which a support bridge is not required. The support bridge may also be interchangeable with other embodiments of a support bridge to facilitate the punching of ferrules belonging to different types of instruments, for example.

According to a second aspect of the invention, there is provided a method of crimping a tendon within a ferrule comprising the steps of threading the tendon through the ferrule, resting the ferrule in a groove such that it is supported from a first direction, tensioning the tendon, punching the ferrule from a second direction opposite to the first direction.

By means of the second aspect of the invention a ferrule may be crimped to a tendon, while the tendon is under tension, by being supported from one direction and punched from an opposite direction. This may be advantageous if access from other directions is limited, for example if the ferrule is one of a plurality of ferrules positioned adjacent to one another in a side-by-side arrangement.

The step of punching the ferrule may be carried out using a punching rig according to the first aspect of the invention or any other suitable apparatus.

In embodiments of the invention, the step of resting the ferrule in a groove such that it is supported from the first direction may comprise supporting the ferrule from below and the step of punching the ferrule from the second direction comprises punching the ferrule from above.

In such embodiments of the invention, the ferrule may rest in the groove, and be supported by the groove, by virtue of gravity acting on the ferrule. Also, punching the ferrule may be carried out by making use of gravity to impart a force on the ferrule.

In embodiments of the invention, the step of punching the ferrule may comprise: aligning a chamber with the ferrule, positioning a punch to extend through the chamber and rest on the ferrule, and dropping a weight to impact the punch.

In such embodiments of the invention, the step of punching the ferrule may be carried out precisely, reliably and repeatably. If the method of crimping a tendon within a ferrule is used as part of a manufacturing method, the quality of manufactured product may therefore be improved. Further, the weight may be a predetermined weight and may be dropped from a predetermined height so that a known force is applied to the punch and hence to the ferrule. This may allow a user of the method to ensure that the ferrule is crimped with sufficient force to provide secure attachment to the tendon while also avoiding application of too much force which may damage the structural integrity of the ferrule.

In embodiments of the invention, the step of punching the ferrule may comprise punching the ferrule at a first location and a second location on the ferrule.

In such embodiments of the invention punching the ferrule in two locations to crimp it to the tendon may facilitate secure attachment of the ferrule to the tendon.

In embodiments of the invention, the step of punching the ferrule at the first location on the ferrule may comprise punching the ferrule a first predetermined number of times at the first location on the ferrule and the step of punching the ferrule at the second location on the ferrule may comprise punching the ferrule a second predetermined number of times at the second location on the ferrule.

In such embodiments of the invention, the first and second predetermined number of times for punching the ferrule at the first and second locations respectively may be determined to ensure that the ferrule is securely attached to the tendon. The more times that the ferrule is punched, the more secure the attachment may be. However, beyond a certain number of punches the improvement to the attachment may become negligible and the time required to carry out the further punches may be wasted.

The first and second predetermined numbers may be equal or may be different.

In embodiments of the invention, the tendon comprises a first end and a second end and the step of tensioning the tendon may comprise the steps of fixing the first end such that it is immobilised relative to the ferrule, attaching the second end to a first end of a tensioning wire, hanging a predetermined weight from a second end of the tensioning wire, thereby tensioning the tendon.

The tendon may form part of a tendon driven instrument such as a surgical robotic instrument. The first end of the tendon may be attached to a component of the instrument to be drivable via actuation of the tendon, such as a rotatable joint, and the step of fixing the first end of the tendon may comprise immobilising the component to which it is attached.

The ferrule may form part of a linearly moveable actuator. The step of fixing the first end of the tendon such that it is immobilised relative to the ferrule may further comprise immobilising the ferrule.

The weight may be determined to provide sufficient tension in the tendon to ensure that there is no slack in the instrument whilst at the same time ensuring that the instrument isn't too stiff to actuate effectively and that the degree of tension is not too close to the tendon's tensile strength.

Using a weight to tension the tendon may allow the step of tensioning the tendon to be reliable and repeatable. Hence, a plurality of tendon driven instruments may be reliably manufactured and/or repaired such that tendons are under the correct amount of tension for the instrument and the application to which the instrument is to be put. For example, this may improve the ability to manufacture tendon driven instruments which are interchangeable so that there is minimal variation in performance between the instruments being used.

In embodiments of the invention, the step of threading a tendon through the ferrule may be repeated for each of a plurality of tendons and their respective ferrules, the step of resting the ferrule in a groove may comprise resting each ferrule in a respective one of a plurality of grooves, the step of tensioning the tendon may comprise tensioning each tendon, and the steps of punching the ferrule at first and second locations may be repeated for each ferrule.

In such embodiments of the invention a plurality of ferrules may be crimped to a respective plurality of tendons wherein each of the tendons is tensioned simultaneously and the ferrules may be crimped in quick succession, one after the other.

In embodiments of the invention, the plurality of ferrules may form part of a drive module and the ferrules may be movable relative to one another, and the method may comprise the further step of immobilising the plurality of ferrules prior to resting each ferrule in its respective groove.

In such embodiments of the invention the drive module may form part of a tendon driven instrument such as a surgical robotic instrument. The drive module may comprise a plurality of actuators moveable linearly and parallel to one another, each actuator comprising a respective one of the ferrules. Immobilising the plurality of ferrules may improve the ease and repeatability with which the ferrules can be punched. Immobilising the plurality of ferrules may also improve the repeatability of crimping each ferrule to a particular position on the respective tendon while it is tensioned.

In embodiments of the invention, the drive module may be engageable with a housing configured to immobilise each ferrule when the drive module is engaged, and the step of immobilising the plurality of ferrules may comprise engaging the drive module with a housing and locking the drive module in engagement with the housing.

In such embodiments of the invention the housing may be adapted to lock each actuator in a fixed position while the housing is engaged with the drive module, thereby immobilising the ferrules.

BRIEF DESCRIPTION OF THE DRAWINGS

Embodiments of the invention will now be described by way of example only with reference to the accompanying drawings in which.

DETAILED DESCRIPTION OF THE EMBODIMENTS

Figure 1:
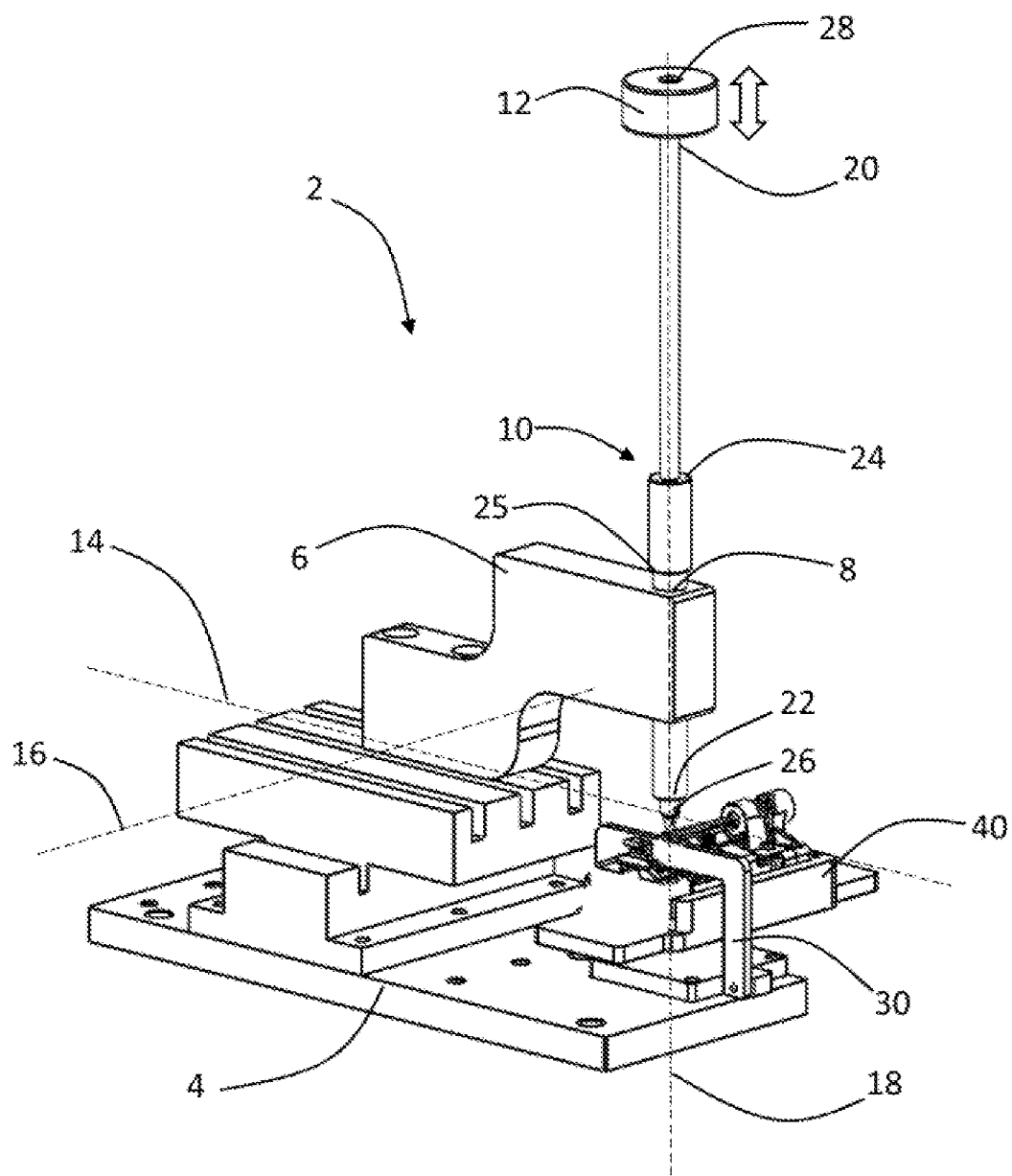
FIG. 1 is a schematic representation of a punching rig according to an embodiment of the first aspect of the invention.

Referring initially to FIG. 1, a punching rig according to an embodiment of the first aspect of the invention is designated generally by the reference numeral 2. The punching rig 2 comprises a base 4, an arm 6, a punch 10 and a weight 12. The arm 6 is engageable with the base 4 and movable relative to the base along a first axis 14 and a second axis 16.

The arm 6 comprises a chamber 8 that is spaced apart from the base 4 and extends along a chamber axis 18 that is normal to the first axis 14 and the second axis 16.

Figure 2:
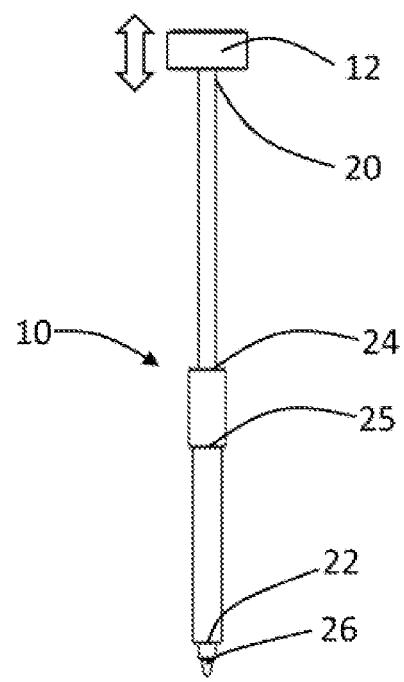
FIG. 2 is a schematic representation of a punch and a weight, each of which form part of the punching rig shown in FIG. 1.

Referring now to FIGS. 1 and 2, the punch 10 comprises a first end 20, a second end 22, a stop 24 positioned between the first end 20 and the second end 22 and a rest positioned between the second end 22 and the stop 24. In this embodiment of the invention, the punch 10 is an elongate and substantially cylindrical member. However, the punch may have any suitable cross-sectional shape aspect ratio, i.e., the ratio between the length and width of the punch.

The punch 10 is slidably receivable within the chamber 8. However, the rest 25 is abuttable against the arm 6 when the punch 10 is slidably received in the chamber 8. Hence, the punch 10 may be slid through the chamber 8, wherein the second end 22 passes through the chamber 8 first, until the rest 25 abuts against the arm 6. The punch 10 may therefore be positioned such that the rest 25 rests on the arm 6 while the second end 22 extends from the chamber 8.

The second end 22 comprises a tip 26 that is tapered and pointed to allow a punching force to be applied more precisely.

The weight 12 is slidable along the punch 10 between the first end 20 and the stop 24 and is abuttable against the stop 24. More particularly, in this embodiment of the invention, the weight 12 comprises an aperture 28 which may slidably receive the first end 20.

The stop 24 is positioned between the first end 20 and the rest 25 meaning that when the weight 12 is dropped over the punch 10, it will slide down along the punch 10 until it impacts against the stop 24 but it will not impact the arm 6. This prevents the weight 12 transferring force to the arm 6 rather than the punch 10.

In this embodiment of the invention both the stop 24 and the rest 25 are formed as a portion of the punch 10 which has a larger diameter than both the first end 20 and the second end 22. However, in other embodiments of the invention the stop 24 and the rest 25 may be two separate features forming part of the punch 10. For example, one or both of the stop 24 and the rest 25 may comprise a protrusion, a lip, a ridge or any other suitable change in the cross-sectional shape or size that allows the weight to impact against the stop 24 or the rest 25 to abut against the arm 6 as appropriate.

Figures 3A, 3B:
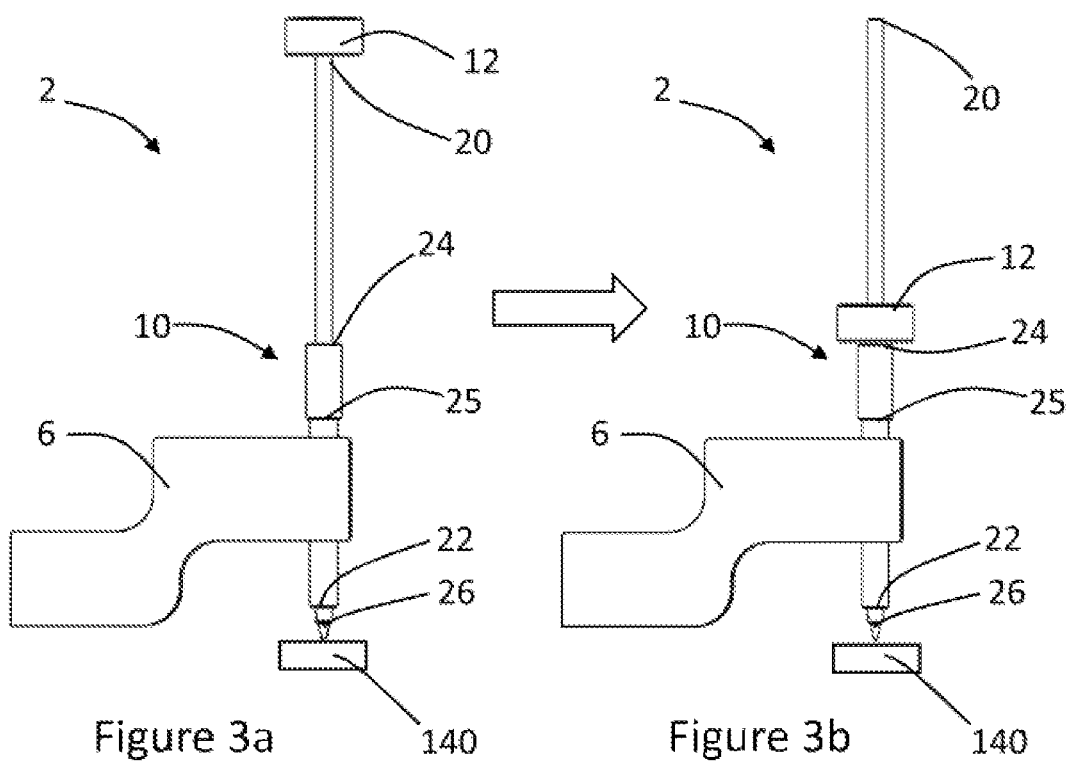
FIGS. 3a and 3b are schematic representations of the punching rig, shown in FIG. 1, in two stages of use.

Referring now to FIGS. 3a and 3b, in use, the arm 6 may be moved to position the punch 10 in alignment with an object to be punched 40 such that the tip 26 rests against the object 140 and the rest 25 is raised above the arm 6. The weight 12 may then be positioned at a predetermined height above the stop 24, such as level with the first end 20, as shown in FIG. 3a. The weight 12 may then be dropped from the predetermined height to fall along the chamber axis 18 until it impacts against the stop 24, as shown in FIG. 3b. Upon impacting the stop 24, the weight 12 will impart a force on the punch 10 which will be transferred to the object 140 via the second end 22, and more particularly the tip 26. Resting the punch 10 above the object 140 so that the rest 24 is spaced apart from the arm 6 prevents the force from the weight 12 being transferred, via the punch 10, to the arm 6 rather than the object 140.

Figure 4:
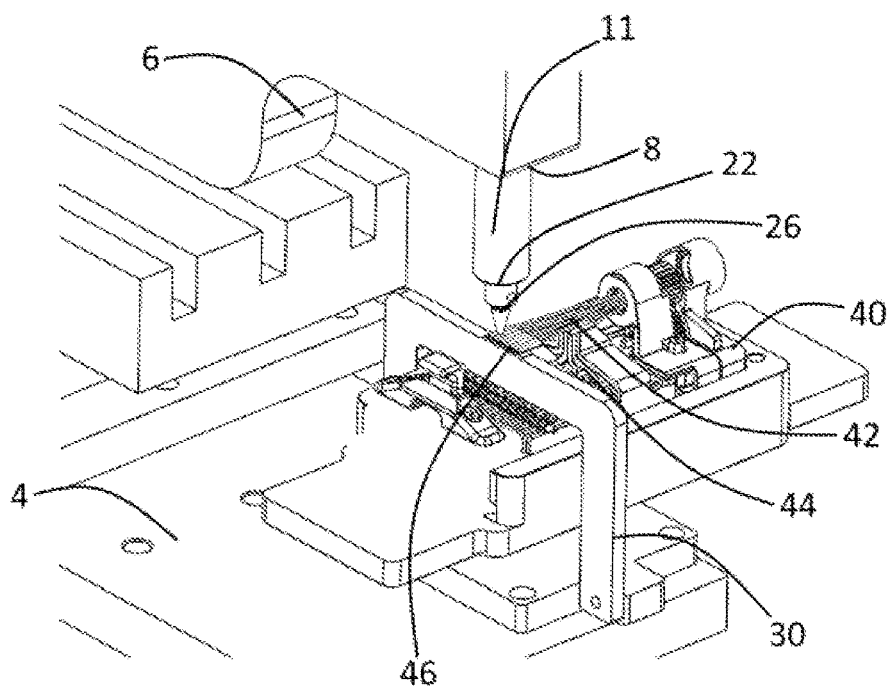
FIG. 4 is a close-up view of part of the punching rig shown in FIG. 1.

Referring now to FIGS. 1 and 4, the object to be punched is a drive module 40.

The drive module 40 is positioned to rest on a support bridge 30. This allows the part of the drive module 40 being punched to be positioned at a known height relative to the punching rig 2, eliminating the effect of any manufacturing tolerances that may be present in the tendon driven instrument if it were freestanding.

FIG. 4 shows that the drive module 40 comprises a plurality of tendons 42 and a plurality of actuators 44. The drive module 40 may form part of a surgical robotic instrument wherein an end effector of the instrument is driven by pulling one of the tendons 42 via movement of an associated actuator 44. In order for the actuators 44 to be able to pull the tendons 42, each actuator 44 comprises a ferrule 46 which may be crimped a respective tendon 42.

The punching rig 2 may be used to crimp a plurality of ferrules 46 to a plurality of tendons 42 as shown in FIG. 4.

The tapered and pointed tip 26 facilitate the accurate punching of small components such as ferrules.

Figure 5:
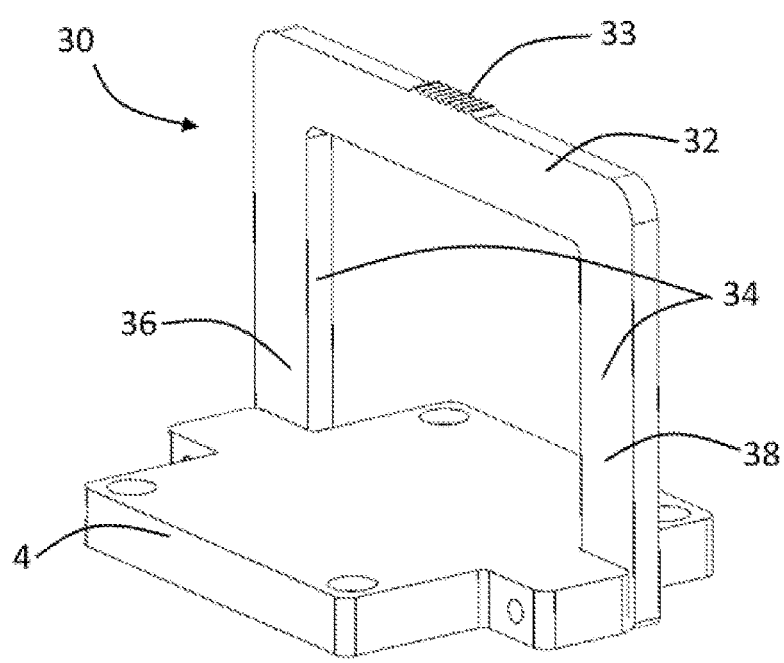
FIG. 5 is a schematic representation of a support bridge forming part of the punching rig shown in FIG. 1.

Referring now to FIG. 5, the support bridge 30 comprises a support beam 32 and a support 34 for supporting the support beam 32 above the base 4. The support beam 32 comprises a plurality of grooves 33 and the chamber 8 is alignable with each groove 33 as shown in FIG. 2. The support 34 comprises a first leg 36 and a second leg 38 spaced apart from one another. Each leg 36, 38 extends between the base 4 and a respective end of the support beam 32.

When the punching rig 2 is used to punch ferrules 46 to crimp them to tendons 42, as shown in FIGS. 1 and 4, the ferrules 46 may be positioned to rest in the grooves 33 so that they are supported from below. Meanwhile, the chamber 8 and punch 10 may be positioned suitably to impart a force on a ferrule 46 from above, thereby compressing the ferrule 46 around the respective tendon 42. The arm 6 may then be moved to reposition the chamber 8 and punch 10 to repeat the punching process on each ferrule 46, optionally at a plurality of locations on each ferrule 46.

Figure 6:
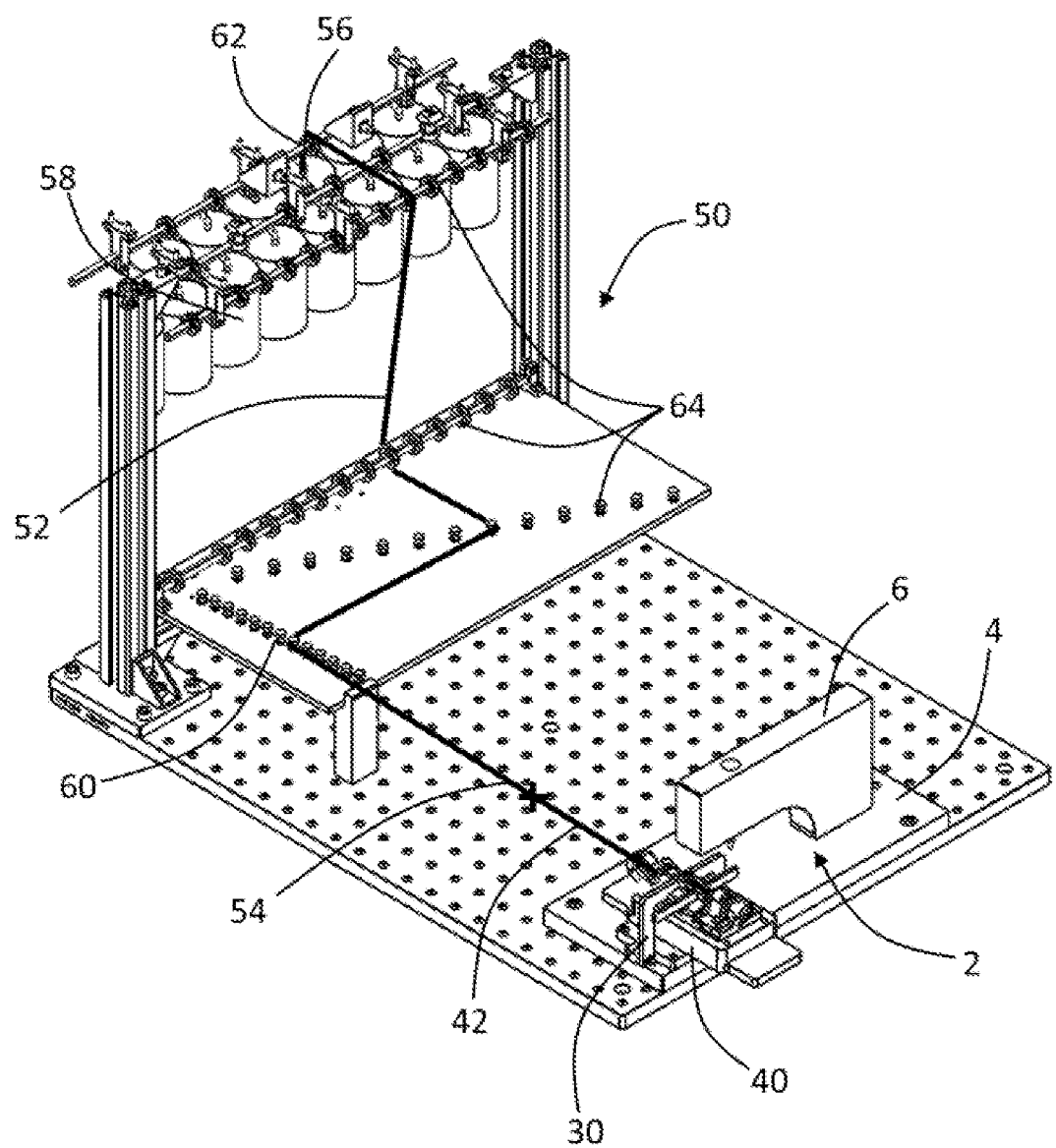
FIG. 6 is a schematic representation of the punching rig shown in FIG. 1 in use with a tensioning rig.

Referring now to FIG. 6, the punching rig 2 may be used in combination with a tensioning rig 50. The tensioning rig 50 comprises a plurality of tensioning wires 52, each comprising a first end 54 and a second end 56 wherein the first end 54 is attachable to the plurality of tendons 42, although only one tensioning wire 52 and tendon 42 is shown in FIG. 4. Each second end 56 of each tensioning wire 52 is attachable to a respective weight 58. By hanging the weight 58 from the respective tensioning wire 52, both the tensioning wire 52 and the associated tendon 42 are placed under a degree of tension dependent on how much the weight 58 weighs.

The tensioning rig 2 further comprises a plurality of primary pulleys 60, a plurality of secondary pulleys 62 and a plurality of auxiliary pulleys 64. Each tensioning wire 52 is engageable with respective primary, secondary and auxiliary pulleys 60, 62, 64.

The positioning of the plurality of primary pulleys 60 allows each of the plurality of tendons 42 to be tensioned while extending substantially coaxial to its respective ferrule. The plurality of auxiliary pulleys 64 are positioned such that the plurality of tensioning wires 52 are separated from one another and then up towards the plurality of secondary pulleys 62. The plurality of secondary pulleys 62 are spaced apart in two rows where the pulleys in each row are off-set from one another to space them apart further without taking up excess space overall. The spacing of the secondary pulleys 62 provides sufficient space for the plurality of weights 6 to hang below without interfering with one another.

Figure 7:
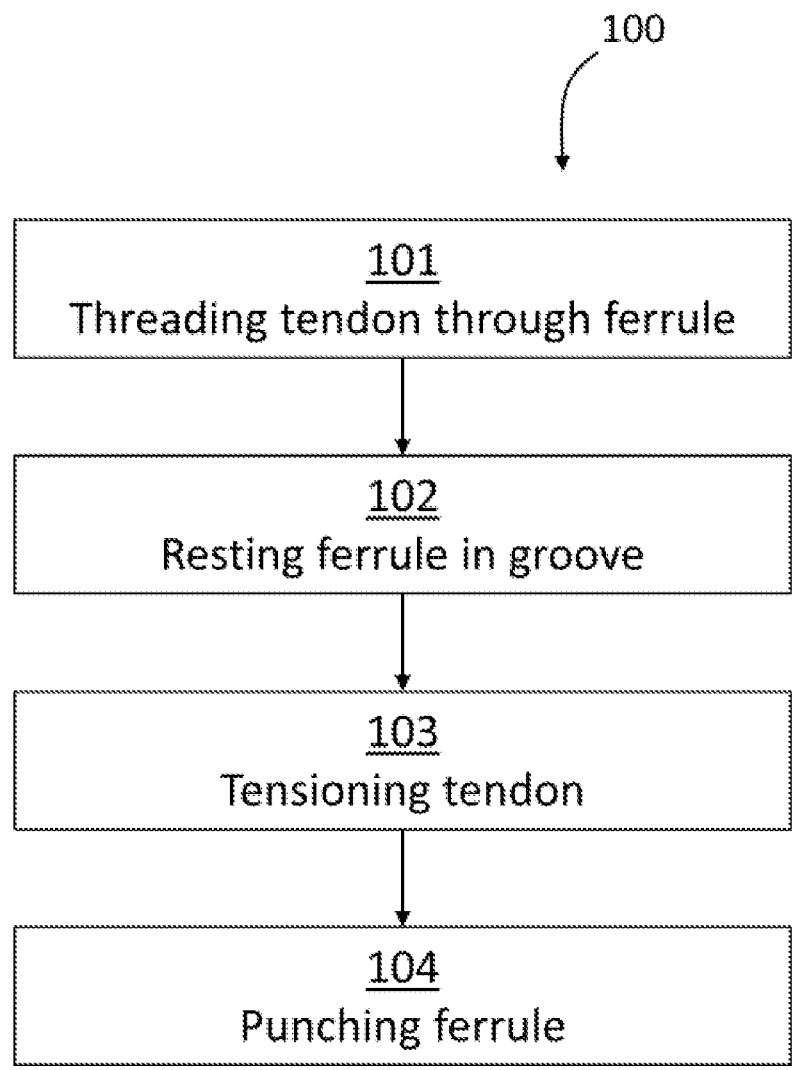
FIG. 7 is a schematic representation of a method according to the second aspect of the invention.

Referring now to FIG. 7, a method according to the second aspect of the invention of crimping a tendon within a ferrule is designated generally by the reference numeral 100. The method 100 comprises steps 101, 102, 103 and 104 described below and may be performed using the punching rig 2 shown in FIGS. 1 to 4 and the tensioning rig 50 shown in FIG. 6. Accordingly, steps 101 to 105 are described with reference to the features of FIGS. 1 to 6. However, it is to be understood that the method 100 may be carried out using any suitable apparatus.

Step 101

Threading each of the plurality of tendons 42 through a respective one of the plurality of ferrules 46.

Step 102

Resting the ferrule 46 in a groove 33 such that it is supported from a first direction.

Step 102 may comprise supporting the ferrule 46 from below using a support bridge 30 as shown in FIG. 2, for example.

Step 103

Tensioning the tendon 42.

The tendon 42 comprises a first end and a second end and step 103 may comprise fixing the first end such that it is immobilised relative to the ferrule 46. For example, the first end may be fixed to a surgical robotic instrument to be driven by actuation of one or more tendons. Step 103 may further comprise attaching the second end to a first end of a tensioning wire 52 and hanging a predetermined weight 58 from a second end of the tensioning wire 52, thereby tensioning the tendon 42.

Step 104

Punching the ferrule 46 from a second direction opposite to the first direction, thereby crimping the ferrule 46 to the tendon 42.

Step 104 may comprise punching the ferrule 46 from above using a punching rig 2 as shown in FIGS. 1 to 4, for example. In particular, step 104 may comprise aligning the chamber 8 with the ferrule 46, positioning the punch 10 to extend through the chamber 8 and rest on the ferrule 46, and dropping the weight 12 to impact the punch 10.

Further, step 104 may comprise punching the ferrule 46 at a first location on the ferrule 46 a first predetermined number of times and at a second location on the ferrule 46 a second predetermined number of times to ensure a secure attachment of the ferrule 46 to the tendon 42. Using the punching rig 2 may improve the ability to perform multiple punches accurately and in quick succession and the ability to punch the ferrule 46 accurately at multiple locations while keeping the ferrules static.

Steps 101 to 104 may be performed to crimp a plurality of tendons within a plurality of ferrules wherein step 101 is repeated for a plurality of tendons 42 and their respective ferrules 46; step 102 comprises resting each ferrule 46 in a respective one of a plurality of grooves 33; step 103 comprises tensioning each tendon 42 and step 104 is repeated for each ferrule 46.

The plurality of ferrules 46 may form part of a drive module 40 wherein the ferrules are movable relative to one another, as shown in FIG. 4 for example. The method 100 may accordingly comprise the further step of immobilising the plurality of ferrules 46 prior to resting each ferrule 46 in its respective groove 33. In some embodiments of the invention, the drive module 40 may be engageable with a housing configured to immobilise each ferrule 46 when the drive module is engaged 40. The step of immobilising the plurality of ferrules 46 comprises may therefore involve engaging the drive module 40 with the housing and locking the drive module 40 in engagement with the housing 40.

Preferences and options for a given aspect, feature or parameter of the invention should, unless the context indicates otherwise, be regarded as having been disclosed in combination with any and all preferences and options for all other aspects, features and parameters of the invention.

The invention claimed is:

1. A punching rig comprising:
   a base;
   an arm engageable with the base and movable relative to the base along a first axis, the arm comprising a chamber that extends along a chamber axis normal to the first axis;
   a punch slidably receivable within the chamber such that it extends along the chamber axis, which punch comprises a first end, a second end and a stop positioned between the first end and the second end; and
   a weight slidable along the punch between the first end and the stop; and
   a support bridge comprising a support beam and a support for supporting the support beam above the base, wherein the support beam comprises a plurality of grooves and the chamber is alignable with each groove.

2. A punching rig according to claim 1, wherein the punch comprises a rest positioned between the second end and the stop, which rest is abuttable against the arm when the punch is slidably received in the chamber.

3. A punching rig according to claim 2, wherein the second end of the punch comprises a tip that is tapered.

4. A punching rig according to claim 1, wherein the arm is moveable relative to the base along a second axis normal to the first axis and the chamber axis.

5. A punching rig according to claim 1, wherein the support comprises a first leg extending between the base and a first end of the support beam and a second leg extending between the base and a second end of the support beam, wherein the first leg is spaced apart from the second leg.

6. A punching rig according to claim 1, wherein the support bridge is removably attachable to the base.

7. A punching rig according to claim 2, wherein the second end of the punch comprises a tip that is pointed.

* * * * *